May 20, 1941.    C. H. INGWER    2,242,954
DIESTOCK
Filed Dec. 29, 1939
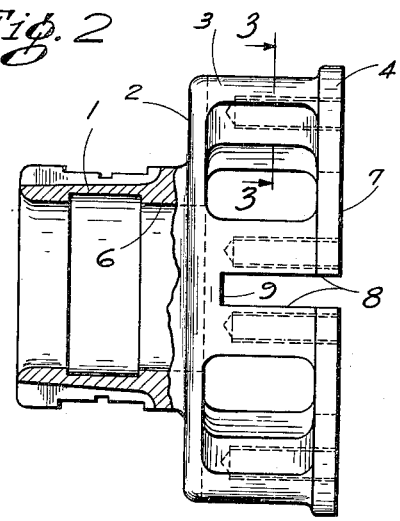
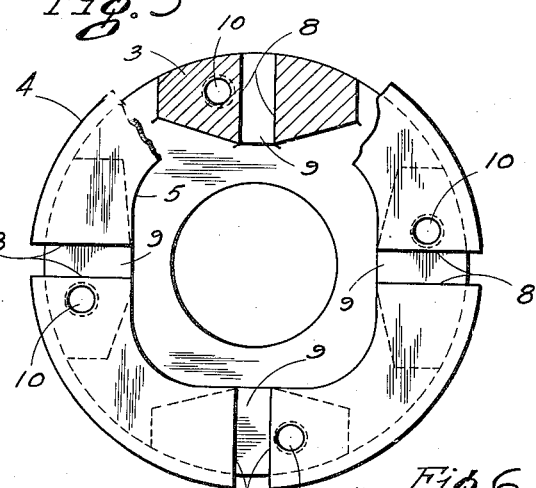
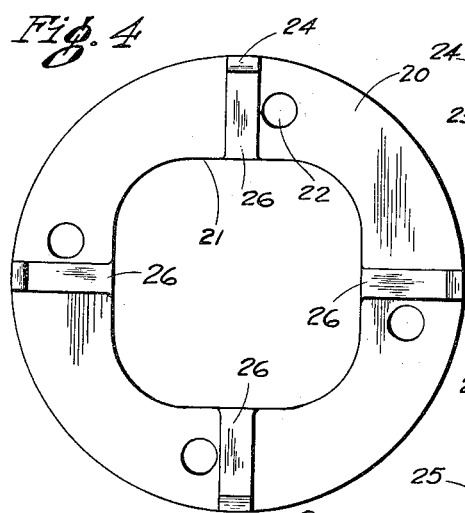
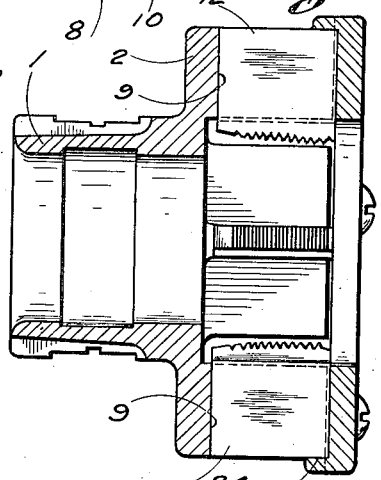
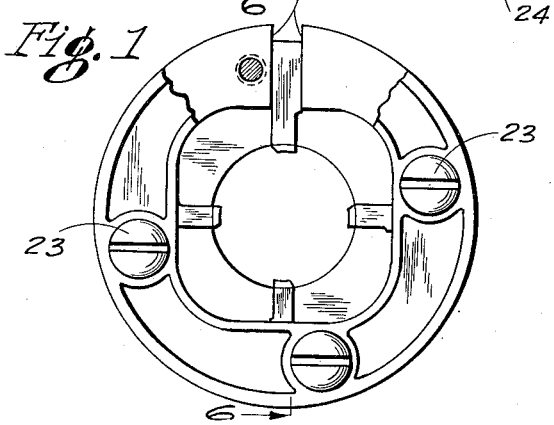
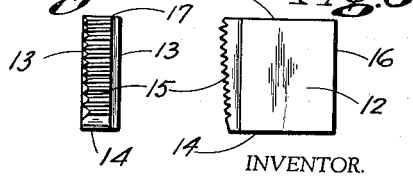
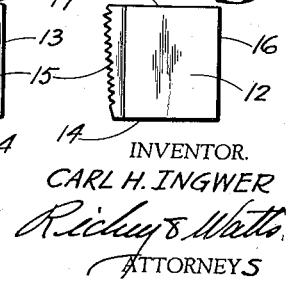
INVENTOR.
CARL H. INGWER
BY Richey & Watts
ATTORNEYS Patented May 20, 1941

2,242,954

UNITED STATES PATENT OFFICE 2,242,954

DIESTOCK

Carl H. Ingwer, Elyria, Ohio, assignor to The Ridge Tool Company, North Ridgeville, Ohio, a corporation of Ohio Application December 29, 1939, Serial No. 311,644

8 Claims. (Cl. 10—120)

This invention relates to improvements in threading dies, and more particularly to an improved die head, such as is used for threading pipes, having a new arrangement for holding the thread cutting chasers.

Heretofore die heads have had various complicated mechanisms for positioning the chasers. These prior devices often necessitated especially designed chasers. Furthermore, the construction of the combination of parts which went to make up the completed die head was such that special machinery was necessary to fabricate the same. Usually each specific design was formulated in such a manner that some particular type of material had to be used in the construction. Some of the die stock bodies necessitated complicated die castings. Others required difficult machining operations to complete the same. It also very often occurred that having once designed a die head for a certain kind of material, it was difficult, if not impossible, to make the die head of any other material because of the peculiarities of construction which were only developed with one material in mind.

By the present invention I am able to make a die stock without the use of expensive and not so strong die castings, and one wherein the machining operations are reduced to a minimum; and where, when such machining operations are necessary, they may be performed without the aid of special machinery which becomes obsolete when the particular model is discontinued.

Furthermore, the design lends itself to simple castings and also permits certain of the parts, where greater strength is desirable, to be forged. Even the chasers themselves are simplified, making it possible to easily reproduce replaceable chasers at relatively low cost. The assembly is also so designed that it is substantially impossible for the device, after having once been disassembled, to be reassembled by inexperienced workmen correctly.

All of the foregoing advantages and certain other advantages, as well as economies in manufacture will hereinafter appear more clearly from the description of an embodiment of the invention, and which embodiment is illustrated by the accompanying figures of drawings, wherein:

Fig. 1 is an elevational view looking at the face of the die with a portion of the face plate broken away to show the underlying die body and chaser;

Fig. 2 is a side elevational view of the die body with the chasers and face plate removed and with the turning sleeve or barrel broken away and shown in section;

Fig. 3 is a front elevational view of the body of Fig. 2 with a portion broken away and shown in section as along the line 3—3 of Fig. 2;

Figs. 4 and 5 are rear and side views respectively of the face plate used with the die;

Fig. 6 is a vertical medial section of the complete die taken along the line 6—6 of Fig. 1; and Figs. 7 to 9 inclusive are end, side and plan views of one of the chasers.

Throughout the drawing, like parts have been designated by like reference characters.

Generally the die comprises a sleeve or barrel adapted for connection to a handle which may be of the ratchet type. The specific sleeve shown is the subject matter of the co-pending application of Carl H. Ingwer, Serial No. 300,445, filed October 20, 1939, and forms no part of the invention herein. A body is provided for the sleeve, which body supports the four thread cutting chasers. The thread cutting chasers are in turn held into the body by a face plate which not only clamps the chasers in the body, but determines their radial position.

More specifically, the sleeve or barrel 1 described in the aforementioned co-pending application is integrally joined with a body for holding the chasers which comprises a base portion 2 extending laterally from the end of the sleeve, being generally ring-shaped. Extending outwardly from the base are a plurality of post-like members 3 of which, in the attached form, there are four disposed at equally spaced intervals about the ring. Connected to the end of the posts and preferably integral therewith, is a second ring-like member 4 which is of slightly larger diameter than the base. The central opening 5 of the portion 4 is of generally square formation with rounded corners.

The housing or body may be formed of a casting, although it is by no means limited to such formation, as explained in the objects. In one form of a casting the external surfaces are preferably machined together with the guiding bore 6 in the sleeve. This machining is, however, not necessarily essential but merely lends to the finished appearance of the same. The face 7 is finished squarely. After machining the exterior end bore, a plurality of channels are machined through the face 7 into the posts 3 to provide diametrically opposed channels 8 in the posts opening through the part 4. The side walls of the channels 8 are parallel and a predetermined fixed distance apart. The bottom walls 9 are in planes normal to the side walls at right angles to the axis of the bore. These channels are adapted to receive the chasers and the side walls absorb the side thrust upon the chasers. Threaded openings 10 are provided, extending into the posts spaced from the channels for the reception of screws hereinafter described.

The chasers, best shown in Figs. 7 to 9 inclusive, each comprises a body 12 having parallel sides 13 adapted for sliding engagement with the walls of the openings 8 and having a bottom side 14 geometrically squared with the sides 13 adapted to rest on the surface 9 in the bottom of the channels 8. Thread-cutting teeth 15 are provided and may be of conventional design. The butt 16 of the chaser is provided with a finished surface spaced a predetermined definite distance from the teeth 15. The chasers are formed of the usual quality of tool steel such as is generally used in devices of this character and which is conducive of long life and sharpness of the cutting teeth.

The top wall 17 opposite the bottom 14 is also provided with a flat machined face and the width of the chaser considering the distance between the walls 14 and 17 is slightly greater than the depth of the channel 8, as is best shown in Fig. 6.

The chasers are held in the channels in a predetermined radially fixed position by a face plate 20. The face plate 20 is, as best shown in Fig. 4, of substantially the same conformation as the end member 7 and comprises a plate of circular formation having a centrally squared opening 21. The plate is provided with counter-sunk holes 22 therethrough for the reception of French headed cap screws 23 which extend through the openings 22 and are screw threaded into the threaded openings 10 in the posts 3. The underside of the face plate or the side adjacent the body of the housing, is provided with four lugs 24 having inner faces 25 machined squarely and extending in a plane normal to the underside of the plate. Extending inwardly from the lugs to the opening 21 are radial bosses 26 which are also machined squarely and adapted for engagement with the surfaces 17 of the chasers. The lugs 24 are adapted for engagement with the butts 16 of the chasers. The sides of the lugs 24 engage in the openings 8 of the plate 7 where it extends beyond the body of the housing. The plate is preferably formed by forging with the lugs 24 and 26 rough, and these lugs are subsequently machined to provide flat chaser-engaging and positioning surfaces just mentioned. In assembling the device, the chasers are placed in the channel 8 where the parallel sides 13 engage the sides of the channel and the bottom 14 rests on the bottom wall 9 of the channel, the face plate is then placed over the chasers with the lugs 24 engaged in the channels 8 and with the bosses 26 resting on the top sides 13 of the chasers. The screws 23 are then screwed securely into the posts, causing the face plate to securely grip and hold the chasers between the face plate and the bottom 9 of the channel. The lugs 24 engage the butts 16 and hold the chasers against outward movement in the channel as well as determine the radial position of the chasers therein.

It will thus be seen that the lugs insure, because of their engagement in the channel, the placement of the face plate on the body of the housing, and also determine the radial position of the chasers. Side thrust on the chasers is taken up by their engagement with the walls of the channel 8; end thrust of the chasers is taken up by their engagement with the lugs 24.

It will also clearly appear that the channels 8 may be quickly, easily and accurately machined in two operations in the device disclosed, and that the machining of the face plate is also equally simply performed as well as that of the chasers without the use of special tools.

Although I have shown the device as including four chasers, it will be obvious that the number of chasers may be varied without departing from the spirit or scope of the invention. Furthermore, the chasers need not necessarily be wider than the openings 8 to extend beyond the face of the portion 7, since the bosses 26 may extend into the channel and engage the faces, providing substantially the same result. Still other departures from the structure shown will be obvious to those skilled in the art, and may be made without departing from the spirit of the invention, which invention is defined in the appended claims.

I claim:

1. A die head comprising a body, said body being formed with radially extending grooves, thread cutting chasers disposed in said grooves, means to position and lock said chasers in said grooves comprising a face plate having lugs extending into the grooves and abutting the ends of the chasers.

2. A die head including a chaser supporting body, said body being formed with straight diametrically disposed channels for holding said chasers, thread cutting chasers disposed in said channels, a face plate for said body and means to secure said face plate to said body, said face plate having means cooperating with the butt ends of said chasers and disposed in the channels in said body to hold the chasers in a predetermined locked position in the body.

3. A threading die comprising a sleeve, a circular flange on the end of the sleeve, posts extending outwardly from the flange parallel to the axis of the sleeve, a second flange carried by the posts in spaced parallel relation to the first flange, a plurality of grooves bisecting the posts and extending through said second flange, chasers disposed in said grooves, a face plate for closing said grooves and holding said chasers in position comprising a ring adapted for connection to said posts and having lugs extending into said grooves and abutting the ends of said chasers.

4. A die head comprising a body, said body being formed with diametrically opposed grooves of rectangular cross section, thread cutting chasers for said die, each comprising a body adapted for a close sliding fit in said grooves and having a thread cutting surface on one end and a chaser locating surfaces on the opposite end, means to hold said chasers in a predetermined locked position in said body comprising a face plate adapted to be secured to the end of the body and having lugs extending into said grooves and positioning said face plate, the inner faces of said lugs comprising locating surfaces for said chasers for positioning said chasers longitudinally in said grooves.

5. A die head comprising a sleeve having a chaser carrying body attached thereto, said body being formed with a plurality of radially extending grooves, each groove having flat parallel side walls and a bottom wall in a plane normal to the side walls, thread cutting chasers for said die and each comprising a rectangular body for close fitting engagement with grooves and having thread cutting teeth on one end and a flat surface in a plane normal to the sides on the other end, said chasers being slidable radially in said grooves, and means for locking said chasers in said grooves comprising a plate, screw means for securing said plate on said body, said plate provided with lugs adapted for lateral engagement in said grooves to position said plate and said lugs having an inner surface for engagement with the ends of said chasers to predetermine the radial position of the chasers in said grooves.

6. A pipe threading die comprising a hollow sleeve adapted for attachment to a turning wrench or ratchet, a body coaxial with said sleeve and comprising a pair of generally circular rings, one of said rings comprising a base ring secured to the sleeve and having a plurality of posts extending from and supporting the second ring supported in spaced parallel relation from the first ring, said posts being formed with parallel walled chaser receiving openings extending radially therethrough and through the second ring, a plurality of chasers for said die head, each chaser comprising a body having parallel side walls for slidable engagement in said openings and having thread cutting teeth on one end and a plane surface on the opposite end positioned a predetermined distance from said teeth, said body being so proportioned as to extend beyond the confines of said opening, means to secure the chasers in predetermined position and resist outward thrust of said chasers comprising a face plate having lugs extending into said openings for positioning the face plate on the second ring, said lugs each having an inner face for engaging and predetermining the radial positions of each chaser, and screw means for securing the face plate to the body to clamp said chasers securely in position.

7. A threading die including a body having chaser slots therein, chasers disposed in said slots, and means to hold said chasers in predetermined position in the slots comprising a face plate provided with lugs having flat faces for lateral engagement with the sides of the slots to position the face plate, the inner surfaces of said lugs facing into said slots being formed with flat chaser-engaging surfaces for engagement with the ends of the chasers for radially positioning the chasers.

8. A threading die including a body having a central work receiving opening therein, a plurality of posts in said body extending coaxially around the work receiving opening, said posts having diametrically opposed chaser slots, chasers disposed in said slots, and means to hold said chasers in predetermined position in the slots comprising a face plate, said face plate having means for determining its position on the ends of said posts and to determine the radial positions of said chasers comprising lugs disposed for lateral engagement with the said slots in said posts, the inner surfaces of said lugs being formed with chaser-engaging surfaces for positioning the chasers.

CARL H. INGWER.